(12) United States Patent
Heisele (10) Patent No.: US 9,418,467 B2
(45) Date of Patent: Aug. 16, 2016

(54) 3D HUMAN MODELS APPLIED TO PEDESTRIAN POSE CLASSIFICATION

(71) Applicant: Honda Motor Co., Ltd., Tokyo (JP)

(72) Inventor: Bernd Heisele, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 210 days.

(21) Appl. No.: 14/084,966

(22) Filed: Nov. 20, 2013

(65) Prior Publication Data

US 2014/0176551 A1 Jun. 26, 2014

Related U.S. Application Data

(60) Provisional application No. 61/745,235, filed on Dec. 21, 2012.

(51) Int. Cl.
*G06T 15/00* (2011.01)
*G06T 7/00* (2006.01)
*G06K 9/00* (2006.01)

(52) U.S. Cl.
CPC ............ *G06T 15/00* (2013.01); *G06K 9/00208* (2013.01); *G06K 9/00362* (2013.01); *G06K 9/00805* (2013.01); *G06T 7/0046* (2013.01); *G06T 2207/30196* (2013.01)

(58) Field of Classification Search
None
See application file for complete search history.

(56) References Cited

U.S. PATENT DOCUMENTS

2008/0025568 A1\* 1/2008 Han .................... G06K 9/4642
382/103

OTHER PUBLICATIONS

Pishchulin, Leonid, et al. "Learning people detection models from few training samples." Computer Vision and Pattern Recognition (CVPR), 2011 IEEE Conference on. IEEE, 2011.\*
M. Enzweiler and D. Gavrila. Integrated pedestrian classification and orientation estimation. In Computer Vision and Pattern Recognition (CVPR), pp. 982-989. IEEE, 2010.\*

\* cited by examiner

*Primary Examiner* — Daniel Hajnik
(74) *Attorney, Agent, or Firm* — Arent Fox LLP (57) ABSTRACT

A pedestrian pose classification model is trained. A three-dimensional (3D) model of a pedestrian is received. A set of image parameters indicating how to generate an image of a pedestrian is received. A two-dimensional (2D) synthetic image is generated based on the received 3D model and the received set of image parameters. The generated synthetic image is annotated with the set of image parameters. A plurality of pedestrian pose classifiers is trained through the annotated synthetic image.

20 Claims, 6 Drawing Sheets

3D HUMAN MODELS APPLIED TO PEDESTRIAN POSE CLASSIFICATION

RELATED APPLICATION

This application claims the benefit of U.S. Provisional Application No. 61/745,235, filed Dec. 21, 2012, which is incorporated by reference herein in its entirety.

BACKGROUND

1. Technical Field

This application generally relates to the field of object classification and, in particular, to the use of synthetic data in the classification of pedestrian pose.

2. Background Information

A vehicle (e.g., an automobile) outfitted with a pedestrian detection system can warn its driver that a pedestrian is nearby. However, pedestrian detection alone is not sufficient. The danger of the situation should be assessed also. Only when there is the risk of an accident should a warning be produced. Otherwise, the driver will be unnecessarily distracted. The danger of the situation is related to, for example, whether the pedestrian is likely to step in the path of the vehicle.

"Object classification" refers to the task of automatically classifying an object in a video image or a still image. For example, a classification system may determine whether a person (e.g., a pedestrian) in a still image is facing left, facing right, facing front, or facing back. Pedestrian pose classification may be used, for example, in a vehicle to increase the safety of the driver of the vehicle, pedestrians, bicyclists, and any other person sharing the road with the vehicle.

Many problems exist with current object classification systems. One problem is the lack of an extensive training set for training the object classification model. A training set, which includes positive samples (images including an object of a particular class) and negative samples (images not including an object of the particular class, such as images including an object of another class), is provided to a machine learning algorithm to produce an object classification model.

Furthermore, when generating a new training set for a certain type of object, each image is manually annotated with certain pieces of information. For example, the classification of the object present in the image and/or certain parameters of the object present in the image (e.g., color of the object and location of the object within the image) may be added to the image. The machine learning algorithm uses those annotations and images to generate a model for classifying the object. The annotation process can be tedious and time consuming.

APPLICATION SUMMARY

The above and other issues are addressed by a method, non-transitory computer-readable storage medium, and system for training a pedestrian pose classification model. An embodiment of the method comprises receiving a three-dimensional (3D) model of a pedestrian. The method further comprises receiving a set of image parameters indicating how to generate an image of a pedestrian. The method further comprises generating a two-dimensional (2D) synthetic image based on the received 3D model and the received set of image parameters. The method further comprises annotating the generated synthetic image with the set of image parameters. The method further comprises training a plurality of pedestrian pose classifiers through the annotated synthetic image.

An embodiment of the medium stores executable instructions for training a pedestrian pose classification model. The instructions receive a three-dimensional (3D) model of a pedestrian. The instructions further receive a set of image parameters indicating how to generate an image of a pedestrian. The instructions further generate a two-dimensional (2D) synthetic image based on the received 3D model and the received set of image parameters. The instructions further annotate the generated synthetic image with the set of image parameters. The instructions further train a plurality of pedestrian pose classifiers through the annotated synthetic image.

An embodiment of the system comprises a non-transitory computer-readable storage medium storing executable instructions. The instructions receive a three-dimensional (3D) model of a pedestrian. The instructions further receive a set of image parameters indicating how to generate an image of a pedestrian. The instructions further generate a two-dimensional (2D) synthetic image based on the received 3D model and the received set of image parameters. The instructions further annotate the generated synthetic image with the set of image parameters. The instructions further train a plurality of pedestrian pose classifiers through the annotated synthetic image.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments are now described with reference to the figures where like reference numbers indicate identical or functionally similar elements. Also in the figures, the left most digits of each reference number corresponds to the figure in which the reference number is first used.

Figure 1:
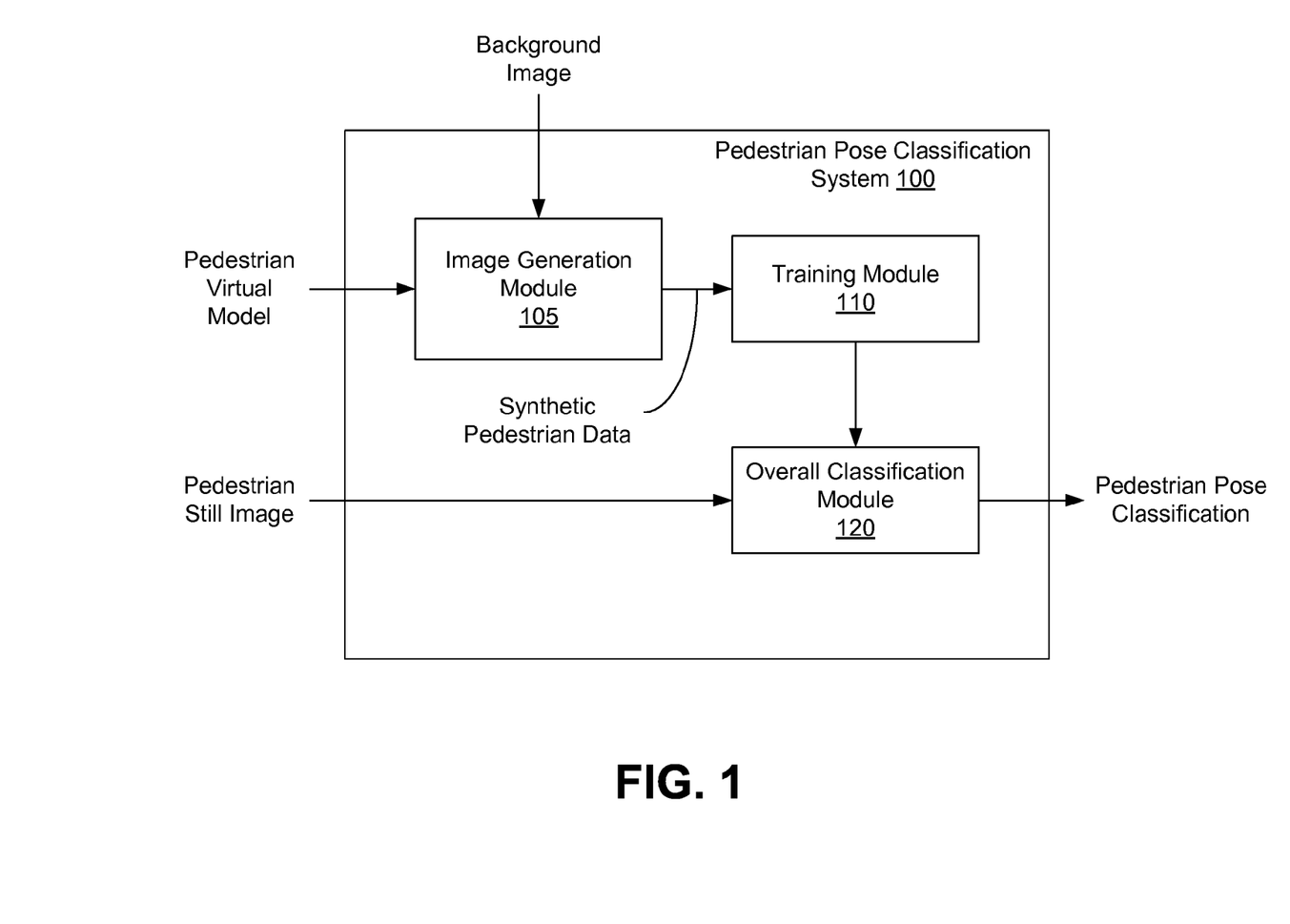
FIG. 1 is a high-level block diagram illustrating a pedestrian pose classification system, in accordance with an embodiment.

FIG. 1 is a high-level block diagram illustrating a pedestrian pose classification system 100, in accordance with an embodiment. The pedestrian pose classification system 100 may include an image generation module 105, a training module 110 and an overall classification module 120. Given a still image of a pedestrian, the pedestrian pose classification system 100 may classify the pedestrian's pose. In one embodiment, the pose is classified as "facing left", "facing right", or "facing front or back". The pedestrian pose classification system 100 may be used in a vehicle to classify the pose of a nearby pedestrian outside the vehicle. The pose classification can then be used to determine whether the pedestrian may step into the path of the vehicle.

Knowledge of a pedestrian's pose may be used, for example, in a vehicle accident avoidance system to increase the safety of the people inside the vehicle and the safety of pedestrians sharing the road with the vehicle. Drivers, while driving a vehicle, may need to pay attention to multiple objects and events happening in their surroundings. For instance, a driver may need to pay attention to traffic signs (e.g., traffic lights, speed signs, and warning signs), vehicle parameters (e.g., vehicle speed, engine speed, oil temperature, and gas level), other vehicles sharing the road, pedestrians trying to cross the street, etc. Sometimes, pedestrians may be overlooked and may be involved in an accident.

If the presence of a pedestrian (who may step into the path of a vehicle) is detected, then the driver can be alerted of the presence of the pedestrian. For instance, consider a pedestrian located to the right of the vehicle. If the pedestrian is facing left, then the pedestrian is more likely to step into the path of the vehicle. If the pedestrian is facing right, then the pedestrian is less likely to step into the path of the vehicle.

The image generation module 105 receives as an input a three-dimensional (3D) virtual model of a pedestrian and a background image, generates a two-dimensional (2D) image of the pedestrian, annotates the generated 2D image, and outputs the annotated 2D image ("synthetic pedestrian data"). The image generation module 105 may also receive a set of parameters to use when generating the 2D image of the pedestrian (not shown).

The training module 110 receives as an input the annotated 2D image generated by the image generation module 105 (synthetic pedestrian data). The training module 110 then uses the synthetic pedestrian data to train a pedestrian pose classifier for classifying the pose of a pedestrian in an image and outputs the trained pedestrian pose classifier. The synthetic pedestrian data are further described below with reference to FIG. 3A.

The overall classification module 120 receives a still image of a pedestrian and the pedestrian pose classifiers trained by the training module 110, determines a classification of the pose of the pedestrian, and outputs the classification. In some embodiments, the still image is captured by a camera mounted on a vehicle. For instance, a still image may be captured with a charged coupled device (CCD) camera with a 1/1.8 inch sensor. To increase the shutter speed of the camera and reduce image blur, a camera with a larger sensor may also be used. In some embodiments, a still image is obtained by extracting a frame from a video. The pedestrian pose classification may be a ternary result (e.g., facing left, facing right, or facing front or back).

Figure 2:
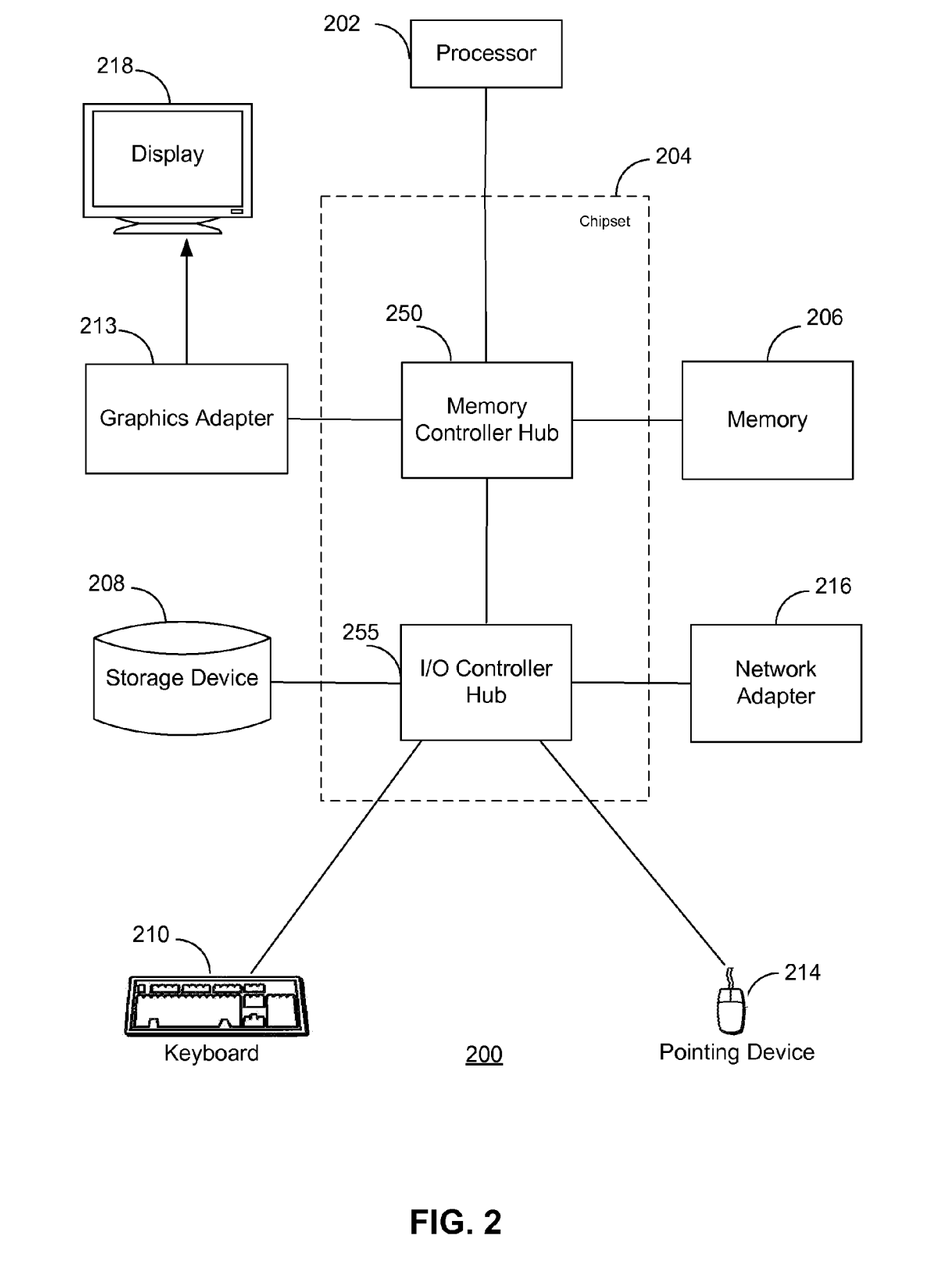
FIG. 2 is a high-level block diagram illustrating an example of a computer for use as the pedestrian pose classification system illustrated in FIG. 1, in accordance with an embodiment.

FIG. 2 is a high-level block diagram illustrating an example of a computer 200 for use as the pedestrian pose classification system 100 illustrated in FIG. 1, in accordance with an embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to a communications network or other computer system (not shown).

Some embodiments of the computer 200 have different and/or other components than those shown in FIG. 2. For example, the computer 200 can be an embedded system and lack a graphics adapter 213, display device 218, keyboard 210, pointing device 214, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3A:
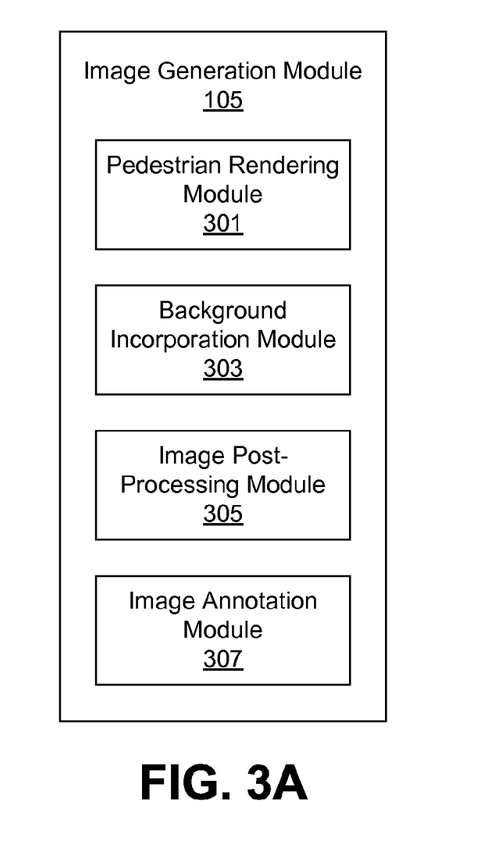
FIG. 3A is a high-level block diagram illustrating a detailed view of the image generation module illustrated in FIG. 1, in accordance with an embodiment.

FIG. 3A is a high-level block diagram illustrating a detailed view of the image generation module 105 illustrated in FIG. 1, in accordance with an embodiment. The image generation module 105 includes a pedestrian rendering module 301, a background incorporation module 303, an image post-processing module 305, and an image annotation module 307.

The pedestrian rendering module 301 receives as an input a three-dimensional (3D) virtual model of a pedestrian and a set of parameters, renders a two-dimensional (2D) image of the pedestrian based on the received parameters, and outputs the rendered 2D image. The set of parameters may include, for example, gender of the pedestrian (e.g., male or female), height of the pedestrian, body type of the pedestrian (ectomorph, endomorph, or mesomorph), hair color of the pedestrian (black, brown, blond, etc.), clothing of the pedestrian (shirt, pants, shoes, etc.), accessories used by the pedestrian (hat, backpack, umbrella, etc.), and/or pose classification of the pedestrian (facing left, facing right, or facing front or back).

Additionally, the pedestrian rendering module 301 may also receive lighting parameters (e.g., lighting source azimuth, lighting source elevation, lighting source intensity, and ambient light energy), camera parameters (e.g., camera azimuth, camera elevation, and camera rotation), and rendering parameters (image size, border size, etc.).

The background incorporation module 303 receives as input the 2D pedestrian image generated by the pedestrian rendering module 301 and a 2D background image, combines the pedestrian image and the background image, and outputs the combined 2D image. In some embodiments, the background image is chosen from a library of background images. The background incorporation module 303 may also receive as a parameter a location that indicates where, within the background image, the pedestrian image should be placed and places the pedestrian image in the received location. For example, the background incorporation module 303 may receive as a parameter a coordinate point indicating where to place the pedestrian image within the background image. Alternatively, the background incorporation module 303 may receive as a parameter two points defining a square in which the pedestrian image should be placed.

The image post-processing module 305 receives the 2D image of the pedestrian with the background generated by the background incorporation module 303, edits the received image so that it can be used by the training module 110, and outputs the edited image. For example, the image post-processing module 305 may smooth the image, down sample the image, crop the image, etc.

The image annotation module 307 receives as input the image output by the image post-processing module 305, annotates the received image with the ground truth of the received image, and outputs the annotated image. In some embodiments, the ground truth indicates the pose classification of the pedestrian (e.g., facing left, facing right, or facing front or back). In other embodiments, the ground truth also includes other parameters used to render the image. The ground truth may also include the position of the pedestrian in the image. For example, the image annotation module 307 may annotate the image with a coordinate point (or two points defining a square) indicating where the pedestrian is located in the image.

Figure 3B:
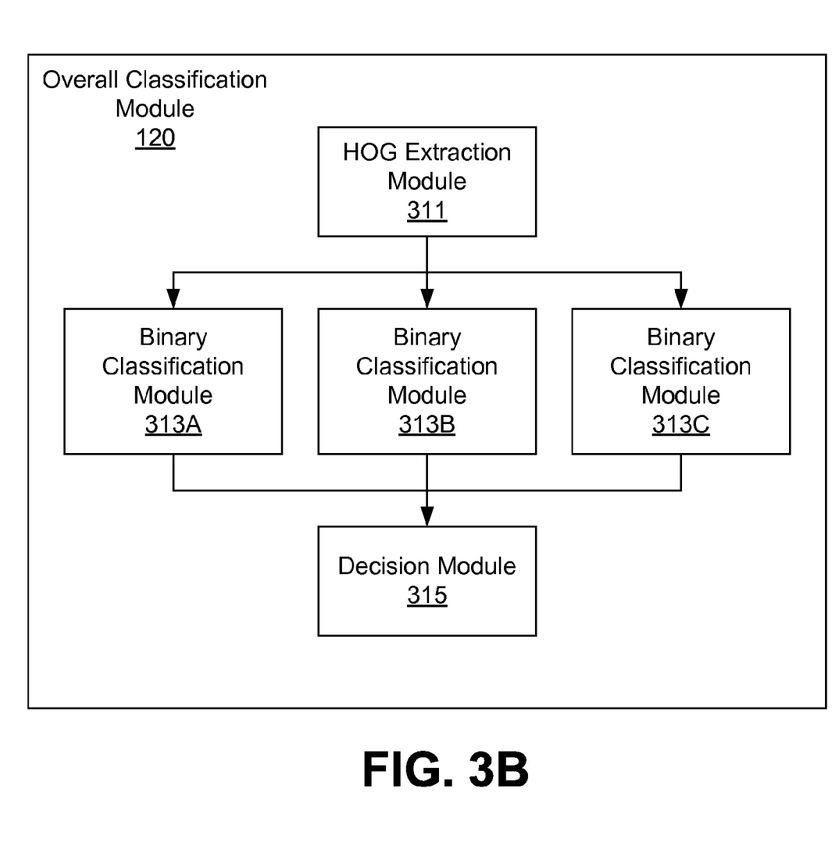
FIG. 3B is a high-level block diagram illustrating a detailed view of the overall classification module illustrated in FIG. 1, in accordance with an embodiment.

FIG. 3B is a high-level block diagram illustrating a detailed view of the overall classification module 120 illustrated in FIG. 1, in accordance with an embodiment. The overall classification module 120 includes a histogram oriented gradients (HOG) extraction module 311, multiple binary classification modules 313, and a decision module 315.

The histogram oriented gradients (HOG) extraction module 311 receives a still image, extracts HOG features from the received still image, and outputs the extracted features. As used herein, histogram oriented gradients (HOG) are feature descriptors used in computer vision and image processing for the purpose of object classification. A HOG feature indicates the number of occurrences of gradient orientation in a localized portion of an image.

The HOG extraction module 311 extracts HOG features by dividing the received image into multiple cells. For example, the HOG extraction module 311 may calculate HOG features using a cell size of 8×8 pixels. For each cell, the HOG extraction module 311 calculates a one dimensional (1D) histogram of gradient directions over the pixels of the cell. In some embodiments, the HOG extraction module 311 normalizes the image for variation of illumination throughout the received image by dividing the image into blocks, calculating a local histogram energy of the block, and normalizing the cells within the block based on the calculated local histogram energy. For example, the HOG extraction module 311 may calculate local histogram energies with a block size of 2×2 cells.

In one embodiment, the HOG extraction module 311 extracts HOG features from an image with a predefined size. For instance, the HOG extraction module 311 may extract HOG features from a 32×64 pixel image. If the received image is larger or smaller in size, the HOG extraction module downscales or upscales the image until the image size is equal to the predefined image size.

A binary classification module 313 receives as input a set of HOG features from an image, uses a classifier (e.g., support vector machine or "SVM") and the HOG features to determine whether the pose of a pedestrian present in the image belongs to a particular class, and outputs a binary result (e.g., yes/no) and a confidence value. In some embodiments, a binary classification module 313 uses a linear classifier, such as a linear SVM. In other embodiments, a binary classification module 313 uses a non-linear classifier, such as a radial basis function (RBF) SVM. The confidence value outputted by a binary classification module 313 indicates a probability that the binary result is correct.

As used herein, a linear classifier identifies whether an object (e.g., a still image) belongs to a particular class (e.g., pedestrian facing left, pedestrian facing right, pedestrian facing front or back) based on a linear combination (or function) of the characteristics or features of the object. In one embodiment, the output of the linear classifier is given by $y = f(\omega \cdot x)$ where y is the output of the linear classification module, $\omega$ is a weight vector determined by the training module 110, and x is a feature vector containing the values of the features of the object being classified.

As used herein, a non-linear classifier identifies whether an object (e.g., an image) belongs to a particular class (e.g., pedestrian facing left, pedestrian facing right, pedestrian facing front or back) based on a non-linear combination (or function) of the features of the object.

Each of the binary classification modules 313 may classify the pedestrian still image with respect to one pose. For instance, binary classification module 313A may classify a pedestrian image to determine whether the image contains a pedestrian facing left, binary classification module 313B may classify a pedestrian image to determine whether the image contains a pedestrian facing right, and binary classification module 313C may classify a pedestrian image to determine whether the image contains a pedestrian facing front or back. In some embodiments, binary classification module 313A generates a score (e.g., a confidence value) based on the probability that the pedestrian still image contains a pedestrian facing left, binary classification module 313B generates a score (confidence value) based on the probability that the pedestrian still image contains a pedestrian facing right, and binary classification module 313C generates a score (confidence value) based on the probability that the pedestrian still image contains a pedestrian facing front or back.

The decision module 315 receives the output from each of the binary classification modules 313 and determines the pose classification of a pedestrian in a still image. In one embodiment, the decision module determines the pose classification as:

$$p_{max} = \max_i p_i$$
$$c = \begin{cases} \text{argmax}_i \, p_i & \text{if } p_{max} > \theta \\ -1 & \text{else} \end{cases}$$

where i is 0, 1, or 2 and $p_0$ is the probability that a pedestrian in a still image is facing to the left (as determined by binary classification module 313A), $p_1$ is the probability that a pedestrian in a still image is facing to the right (as determined by binary classification module 313B), and $p_2$ is the probability that a pedestrian in a still image is either facing front or facing back (as determined by binary classification module 313C). Thus, $p_{max}$ is the largest value of the scores (confidence values) determined by the binary classification modules 313. Additionally, θ is a threshold probability value, and c is the pose classification output by the decision module 315. Thus, the output of the decision module 315 is the pose classification with the highest score (if the score is above a threshold θ) or −1 (if the largest score is equal to or below the threshold). As used herein, an output of −1 by the decision module 315 indicates that the decision module was not able to classify a pose of a pedestrian in the still image.

Figure 4A:
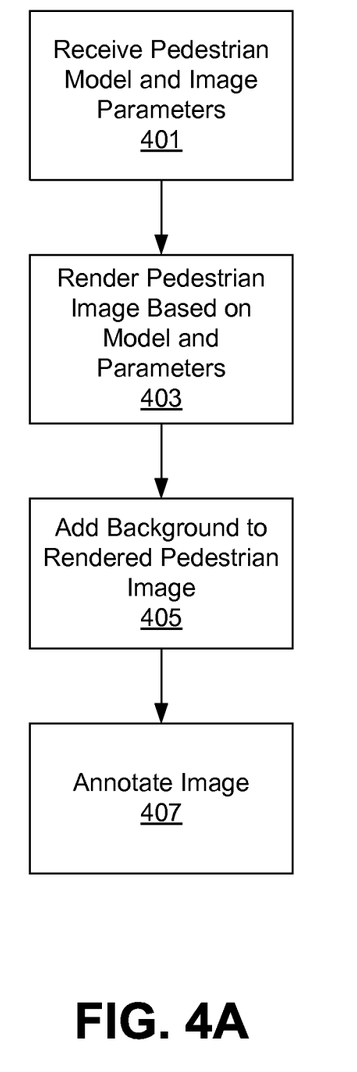
FIG. 4A is a flowchart illustrating a method for generating synthetic pedestrian data, in accordance with an embodiment.

FIG. 4A is a flowchart illustrating a method for generating synthetic pedestrian data, in accordance with an embodiment. The synthetic pedestrian data can be used with a pedestrian pose classifier (e.g., to train the classifier or to test the accuracy of the classifier). The image generation module 105 receives 401 a three-dimensional (3D) pedestrian model and a set of image parameters.

The pedestrian rendering module 301 renders 403 a two-dimensional (2D) image of a pedestrian based on the received pedestrian model and the received image parameters.

The background incorporation module 303 adds 405 a background to the rendered pedestrian image.

In some embodiments (not shown), the image post-processing module 305 may apply image post-processing techniques (e.g., smoothing, down sampling, cropping) to the image of a pedestrian with a background.

The image annotation module 307 annotates 407 the combined image (pedestrian plus background) with the ground truth. For instance, the image annotation module 307 may annotate the image with a value indicating the pose classification of a pedestrian in the image. In other embodiments, the image annotation module 307 further annotates the image with one or more of the received image parameters, such as the accessories used by the pedestrian.

The steps illustrated in FIG. 4A may be repeated multiple times (using different pedestrian models, image parameters, and/or backgrounds) to generate multiple annotated synthetic pedestrian images. For instance, the steps of FIG. 4A may be repeated thousands of times to produce thousands of annotated synthetic pedestrian images.

Figure 4B:
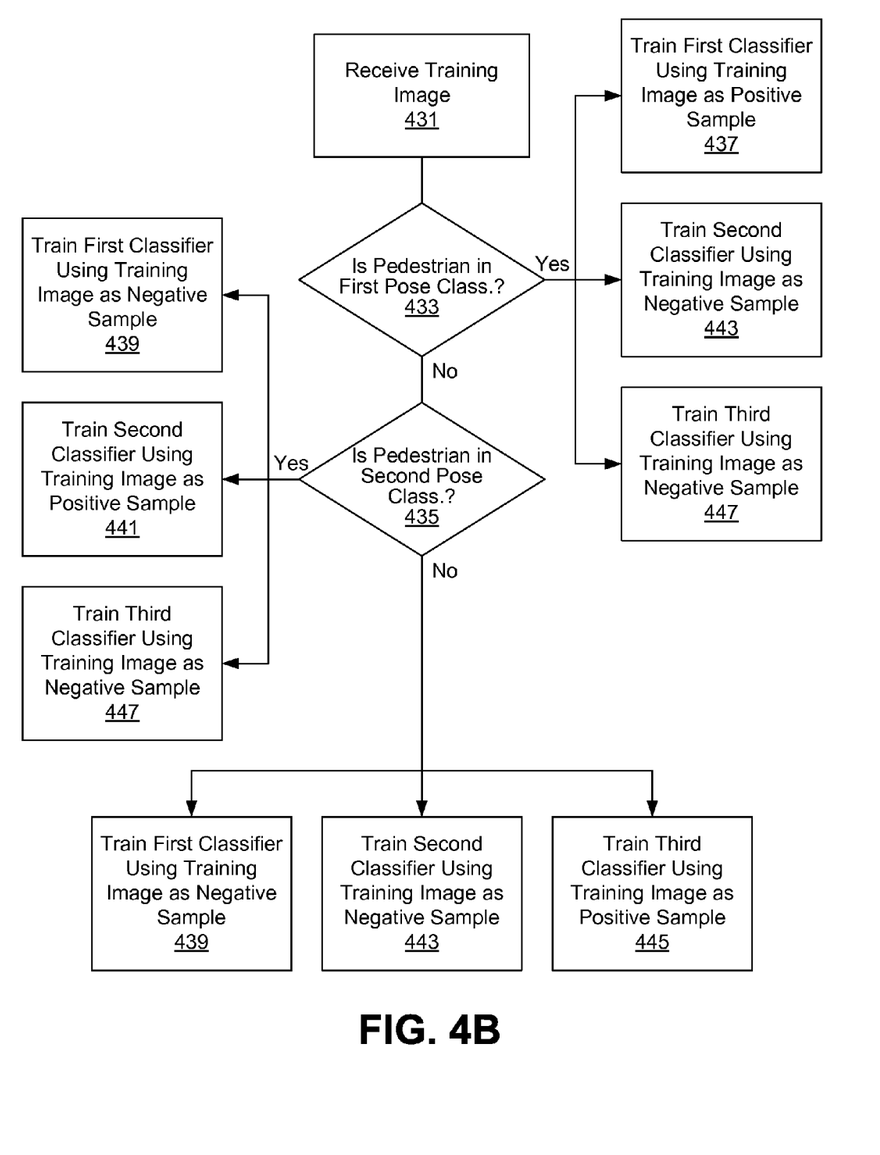
FIG. 4B is a flowchart illustrating a method for training multiple binary pedestrian pose classifiers for use in the overall classification module illustrated in FIG. 3B, in accordance with an embodiment.

FIG. 4B is a flowchart illustrating a method for training multiple binary pedestrian pose classifiers for use in the overall classification module 120 illustrated in FIG. 3B, in accordance with an embodiment. The training module 110 receives 431 an annotated synthetic pedestrian image generated by the image generation module 105 and uses the annotated image to train multiple binary pedestrian pose classifiers using a "one-against-all" approach.

The training module 110 determines 433 whether a pedestrian in the received image is in a first pose classification (e.g., facing left). This determination is performed, for example, by accessing the image's annotation. If the pedestrian is in the first pose classification, the received image is used as a positive sample to train 437 a first binary pedestrian pose classifier, used as a negative sample to train 443 a second binary pedestrian pose classifier, and used as a negative sample to train 447 a third binary pedestrian pose classifier.

If the pedestrian is not in the first pose classification, the training module 110 determines 435 whether the pedestrian in the received image is in a second pose classification (e.g., facing right). This determination is performed, for example, by accessing the image's annotation. If the pedestrian is in the second pose classification, the received image is used as a positive sample to train 441 the second binary pedestrian pose classifier, used as a negative sample to train 439 the first binary pedestrian pose classifier, and used as a negative sample to train 447 the third binary pedestrian pose classifier.

If the pedestrian is not in the second pose classification, the received image is used as a positive sample to train 445 the third binary pedestrian pose classifier, used as a negative sample to train 439 the first binary pedestrian pose classifier, and used as a negative sample to train 443 the second binary pedestrian pose classifier.

Figure 4C:
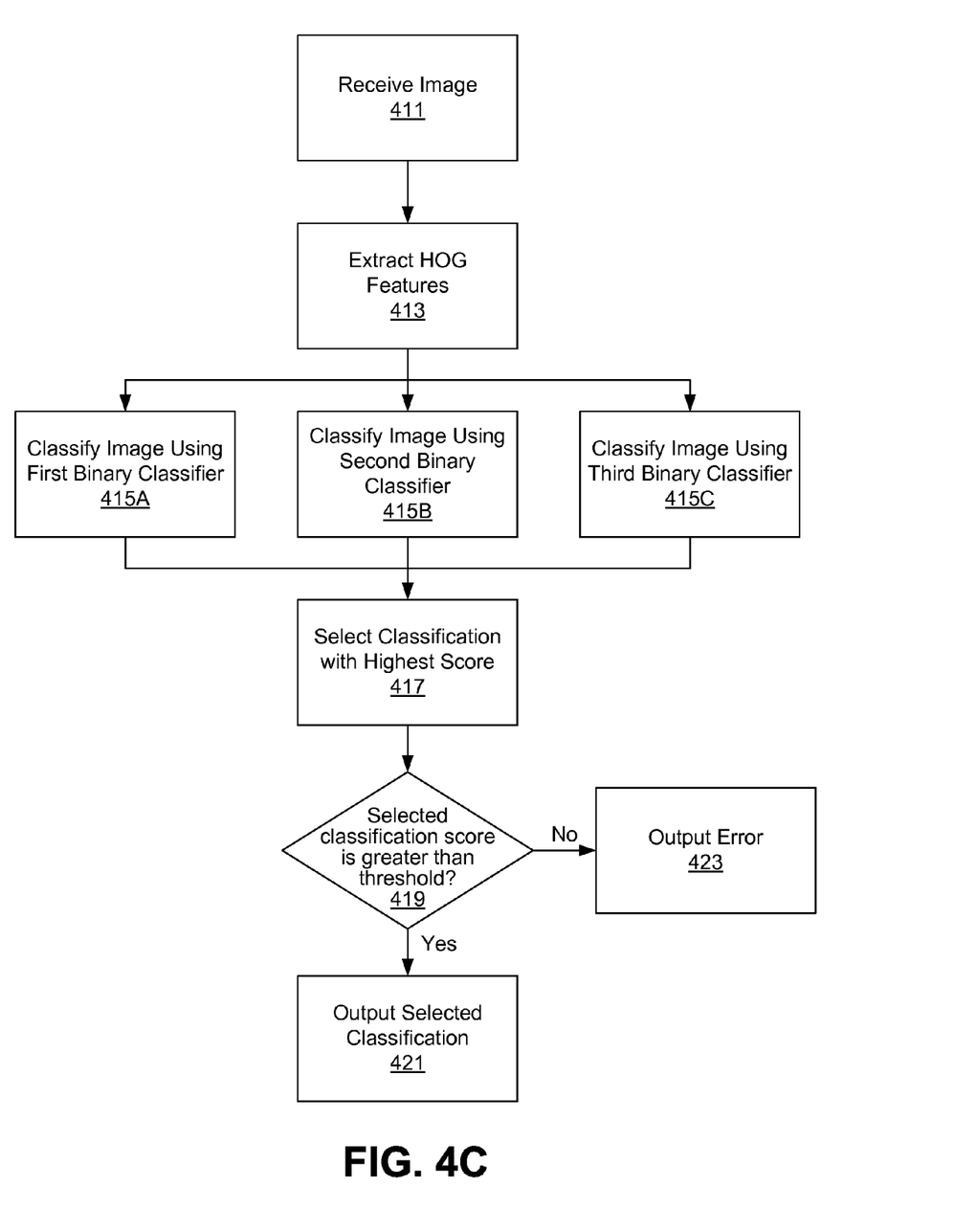
FIG. 4C is a flowchart illustrating a method for classifying the pose of a pedestrian in a still image, in accordance with an embodiment.

FIG. 4C is a flowchart illustrating a method for classifying the pose of a pedestrian in a still image, in accordance with an embodiment. The overall classification module 120 receives 411 a still image to be classified. In some embodiments, the image may be captured with a camera mounted in a vehicle.

The HOG extraction module 311 analyzes the received still image and extracts 413 the HOG features from the received still image.

The first binary classification module 313A classifies 415A the image using the first pedestrian pose classifier trained by the training module 110 and the HOG features extracted by the HOG extraction module. The second binary classification module 313B classifies 415B the image using the second pedestrian pose classifier trained by the training module 110 and the HOG features extracted by the HOG extraction module. The third binary classification module 313C classifies 415C the image using the third pedestrian pose classifier trained by the training module 110 and the HOG features extracted by the HOG extraction module. As part of the classification, each binary pedestrian pose classifier 313 may generate a classification score (e.g., confidence value).

The decision module 315 selects 417 the classification with the highest score and determines 419 whether the selected classification score is greater than a threshold. If the selected classification is greater than the threshold, the selected classification is outputted 421. Otherwise, if the selected classification score is equal to or lower than the threshold, an error may be outputted 423.

The synthetic pedestrian data generated by the image generation module 105 may also be used to benchmark a trained pedestrian pose classifier. For instance, the steps of FIG. 4C can be performed using an annotated synthetic pedestrian image. The pose classification output in step 421 is then compared to the synthetic pedestrian image's annotation. If the output pose classification matches the synthetic pedestrian image's ground truth (e.g., its pose classification), then it can be determined that the trained pedestrian pose classifier is classifying pedestrian images correctly. In one embodiment, multiple annotated synthetic pedestrian images are used to benchmark the trained pedestrian pose classifier, and a percentage of incorrect classifications is determined.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method for training a pedestrian pose classification model, comprising:
   receiving a three-dimensional (3D) model of a pedestrian;
   for each of a plurality of training images of pedestrians, perform the following steps:
   receiving a set of image parameters indicating how to generate an image of a pedestrian and a pose classification of the pedestrian;
   generating a two-dimensional (2D) synthetic image based on the received 3D model and the received set of image parameters;
   annotating the generated synthetic image with the set of image parameters; and
   sequentially training a plurality of pedestrian pose classifiers through the annotated synthetic image, comprising: upon detecting that the pose classification of the pedestrian corresponds to a current pedestrian pose classifier, using the annotated synthetic image as a positive sample to train the current pedestrian pose classifier and using the annotated synthetic image as a negative sample to train the remaining pedestrian pose classifiers.

2. The method of claim 1, wherein training the plurality of pedestrian pose classifiers comprises:
   training a first pedestrian pose classifier from the plurality of pedestrian pose classifiers through the annotated synthetic image as a positive sample responsive to the pose classification of the image parameter being a first pose classification.

3. The method of claim 2, wherein training the plurality of pedestrian pose classifiers further comprises:
   training a second pedestrian pose classifier from the plurality of pedestrian pose classifiers through the annotated synthetic image as a negative sample responsive to the pose classification of the image parameter being the first pose classification.

4. The method of claim 3, wherein training the plurality of pedestrian pose classifiers further comprises:
   training the first pedestrian pose classifier through the annotated synthetic image as a negative sample and training the second pedestrian pose classifier through the annotated synthetic image as a positive sample responsive to the pose classification of the image parameter being a second pose classification.

5. The method of claim 1, wherein generating the 2D synthetic image comprises:
   rendering a 2D image of a pedestrian from the received 3D model; and
   adding a background to the rendered 2D image.

6. The method of claim 1, wherein the pedestrian pose classifiers are binary pedestrian pose classifiers.

7. The method of claim 1, wherein the pedestrian pose classifiers include a non-linear support vector machine (SVM).

8. The method of claim 1, wherein the pedestrian pose classifiers perform classification based on histogram of oriented gradients (HOG) image features.

9. A non-transitory computer-readable storage medium configured to store instructions for training a pedestrian pose classification model, the instructions when executed by a processor cause the processor to:
receive a three-dimensional (3D) model of a pedestrian;
for each of a plurality of training images of pedestrians, perform the following steps:
receive a set of image parameters indicating how to generate an image of a pedestrian and a pose classification of the pedestrian:
generate a two-dimensional (2D) synthetic image based on the received 3D model and the received set of image parameters;
annotate the generated synthetic image with the set of image parameters; and
sequentially train a plurality of pedestrian pose classifiers through the annotated synthetic image, comprising: upon detecting that the pose classification of the pedestrian corresponds to a current pedestrian pose classifier, using the annotated synthetic image as a positive sample to train the current pedestrian pose classifier and using the annotated synthetic image as a negative sample to train the remaining pedestrian pose classifiers.

10. The non-transitory computer-readable storage medium of claim 9, wherein training the plurality of pedestrian pose classifiers comprises:
training a first pedestrian pose classifier from the plurality of pedestrian pose classifiers through the annotated synthetic image as a positive sample responsive to the pose classification of the image parameter being a first pose classification.

11. The non-transitory computer-readable storage medium of claim 10, wherein training the plurality of pedestrian pose classifiers further comprises:
training a second pedestrian pose classifier from the plurality of pedestrian pose classifiers through the annotated synthetic image as a negative sample responsive to the pose classification of the image parameter being the first pose classification.

12. The non-transitory computer-readable storage medium of claim 11, wherein training the plurality of pedestrian pose classifiers further comprises:
training the first pedestrian pose classifier through the annotated synthetic image as a negative sample and training the second pedestrian pose classifier through the annotated synthetic image as a positive sample responsive to the pose classification of the image parameter being a second pose classification.

13. The non-transitory computer-readable storage medium of claim 9, wherein generating the 2D synthetic image comprises:
rendering a 2D image of a pedestrian from the received 3D model; and
adding a background to the rendered 2D image.

14. The non-transitory computer-readable storage medium of claim 9, wherein the pedestrian pose classifiers are binary pedestrian pose classifiers.

15. The non-transitory computer-readable storage medium of claim 9, wherein the pedestrian pose classifiers include a non-linear support vector machine (SVM).

16. The non-transitory computer-readable storage medium of claim 9, wherein the pedestrian pose classifiers perform classification based on histogram of oriented gradients (HOG) image features.

17. A system for training a pedestrian pose classification model, comprising:
a processor; and
a non-transitory computer-readable storage medium storing instructions, the instructions when executed by the processor cause the processor to:
receive a three-dimensional (3D) model of a pedestrian;
for each of a plurality of training images of pedestrians, perform the following steps:
receive a set of image parameters indicating how to generate an image of a pedestrian and a pose classification of the pedestrian:
generate a two-dimensional (2D) synthetic image based on the received 3D model and the received set of image parameters;
annotate the generated synthetic image with the set of image parameters; and
sequentially train a plurality of pedestrian pose classifiers through the annotated synthetic image, comprising: upon detecting that the pose classification of the pedestrian corresponds to a current pedestrian pose classifier, using the annotated synthetic image as a positive sample to train the current pedestrian pose classifier and using the annotated synthetic image as a negative sample to train the remaining pedestrian pose classifiers.

18. The system of claim 17, wherein training the plurality of pedestrian pose classifiers comprises:
training a first pedestrian pose classifier from the plurality of pedestrian pose classifiers through the annotated synthetic image as a positive sample responsive to the pose classification of the image parameter being a first pose classification.

19. The system of claim 18, wherein training the plurality of pedestrian pose classifiers further comprises:
training a second pedestrian pose classifier from the plurality of pedestrian pose classifiers through the annotated synthetic image as a negative sample responsive to the pose classification of the image parameter being the first pose classification.

20. The system of claim 19, wherein training the plurality of pedestrian pose classifiers further comprises:
training the first pedestrian pose classifier through the annotated synthetic image as a negative sample and training the second pedestrian pose classifier through the annotated synthetic image as a positive sample responsive to the pose classification of the image parameter being a second pose classification.

* * * * *